May 7, 1940.   F. A. CLARKE   2,200,158
CONCEALED FASTENING
Filed Nov. 7, 1938

Inventor
F. A. Clarke
by
Mason & Porter
Attorneys

Patented May 7, 1940

2,200,158

UNITED STATES PATENT OFFICE 2,200,158

CONCEALED FASTENING

Frederick Arthur Clarke, Pinner, Middlesex, England, assignor to Naamlooze Vennootschap Yzerhandel I. M. De Vries, Amsterdam, Netherlands Application November 7, 1938, Serial No. 239,406
In Great Britain November 8, 1937

1 Claim. (Cl. 16—114)

The present invention relates to concealed fastenings for a pair of members adapted for engagement in face to face relationship.

Concealed fastenings with a pair of members have been proposed wherein headed pins secured to one member are engageable within key-hole slots formed in the other member and wherein a spring plate secured to the second member is engageable within a recess in the first member, the abutting engagement of the edge of the spring plate with a bounding edge of the recess preventing withdrawal of the headed pins until the spring plate is withdrawn laterally from the recess.

It has also been proposed to provide a concealed fastening between a pair of members wherein headed pins integral with one member are adapted for engagement with key-hole slots in the other member and wherein on relative longitudinal displacement between the members a spring pressed pin carried on the slotted member engages in a recess in the member having the integral headed pins.

Again a fastening device for securing treads on shoe heels has been proposed comprising a pair of interengageable and relatively rotatable plates, one of which has a pair of resilient and diametrally opposed tapered tongues and a pair of intermediate projections all of which are adapted for engagement within slots of the other plate, the projections snapping into their slots when the plates have been relatively angularly rotated by a sufficient amount to complete the insertion of the tapered tongues within their slots.

According to the present invention the engaging face of one member has connected thereto a plate cut at spaced intervals with the cut portions bent out of the plane of the plate to form a number of rigid projections and at least one intermediate resilient projection, whilst the other member has fixed thereto a plate having a corresponding number of slots, the position of one edge of the or each intermediate slot being such that it is engaged by the free end of a resilient projection only after the members have been brought together with the rigid projections of one member opposite the end slots of the other and after the members have been relatively displaced in sliding engagement to bring the ends of said rigid projections within undercut recesses behind the edges of said end slots.

If desired, each plate may be mounted in a recess in the engaging face of its member in which event the depth of each recess preferably is equal to the thickness of the plate located therein. Alternately however, one plate may be secured to a non-recessed face of one member and the other plate secured in a recess of the other member which has a depth equal to the combined depth of both plates. In either event the two members lie in face to face contact when interconnected.

While the invention may be used in interconnecting various kinds of elements it is particularly suitable for connecting door handles and the like fittings to doors and other articles of furniture.

The invention is more particularly described with reference to the accompanying drawing which shows the application of the invention to the connection between a door handle and a door, and in which.

Figure 1:
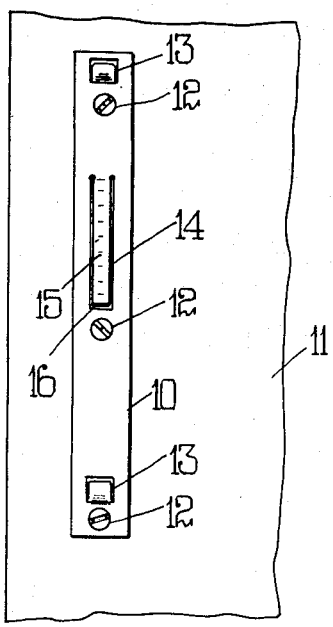
Figure 1 is a view of a door constituting one of the members with its plate in position thereon.
Figures 2, 3:
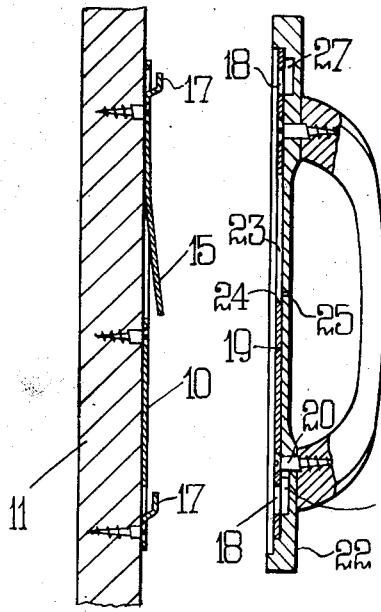
Figure 2 is a corresponding sectional view.
Figure 3 is a view of the door handle in section.

In the construction according to the drawing, a plate 10 is connected to a door 11 by screws 12. This plate is cut along three sides of a rectangle adjacent both ends 13 and intermediate its ends at 14, the length of the longitudinal lines of cut at 14 being considerably in excess of those at 13 to permit the resilient tongue portion 15 formed between the parallel cuts at 14, to be given a length sufficient to enable it to flex out of the plane of the plate at its free end 16 when unloaded and to take up a position in the plane of the plate only on the application of pressure upon it. The cut portions 13 are bent out of the plane of the plate and form rigid projections 17 which are adapted for engagement with slots 18 cut in a plate 19 rigidly secured by screws 20 in a recess 21 of the base of the handle 22.

The base of the recess 21 is further cut away to form recesses 27 which extend beneath the upper lateral edges of the slots 18 to constitute unercut recesses for the reception of the projections 17.

Figure 4:
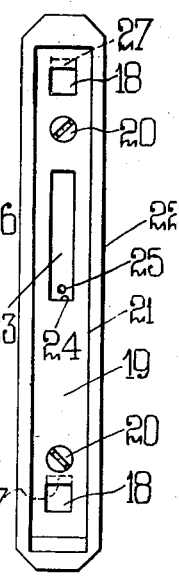
Figure 4 is a rear view.
Figure 5:
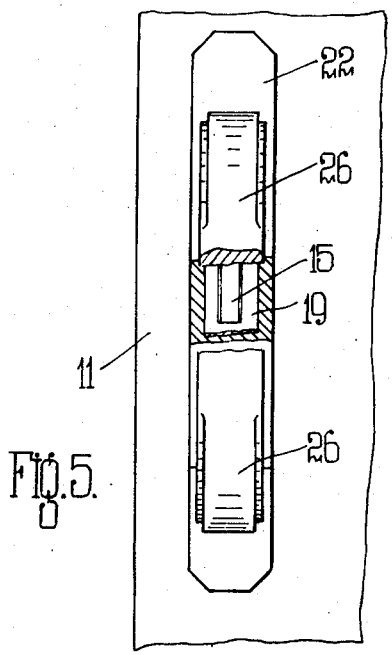
Figure 5 is a view showing the handle on the door but with part of the handle cut away to show the location of a spring of the plate on the door within a recess in the plate on the door handle, when the two members are interconnected.
Figure 6:
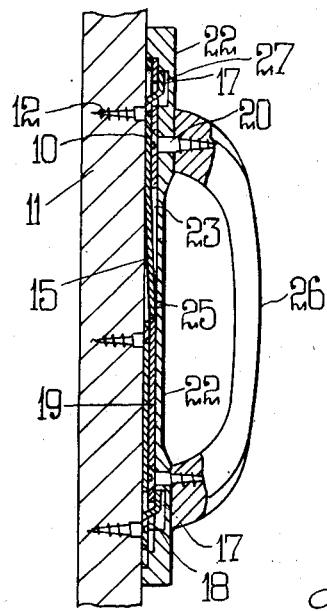
Figure 6 is a corresponding sectional view.

The plate 19 is also cut to form a slot 23, the distance between the lower edge 24 of said slot and the upper edge of the lower slot 18 (Fig. 4)

being slightly greater than the distance between the edge 16 of the tongue 15 and the upper transverse edge of the lower cut portion 13 (Fig. 1). The slots 18 (Fig. 4) are spaced apart by the same distance as the upper and lower cut portions 13 on the plate 10 secured to the door.

Where, as shown in the drawing, the plate 10 is secured to the door face 11 without forming a recess in said face, the recess 21 in the base of the door handle 22 is of sufficient depth to accommodate the plate 19 and the plate 10 when the members are interconnected.

In order to fit the door handle on the door the former is brought into engagement with the latter whereby the projections 17 on the plate 10 enter the slots 18 in the plate 19 on the door handle. In this position of the parts the door handle is permitted to lie in face to face contact with the door. The door handle is then given a sliding movement relative to the door with the result that the projection 17 engage within the undercut recesses 27 behind the upper ends of the slots 18 and when this position of the parts is reached the resilient tongue 15 enters the slot 23 with the lower edge 16 of the spring in abutting relationship with the lower edge 24 of the slot 23. In this position of the elements it is impossible to effect a sliding return of the door handle until the tongue 15 is retracted into the plane of the plate 10, i. e., out of the recess 23, whilst the handle cannot be pulled bodily away from the door by virtue of the engagement of the projections 17 within the undercut recesses 27 behind the upper edges of the slots 18. Accordingly the handle is rigidly locked in position on the door.

In the event of it being desired to apply the invention to constructions in which separation of the members is desired for the purpose for example, of substituting a door handle of one colour or shape by that of another, the base of the handle may have a very fine perforation formed therein as shown at 25, whereby a pin may be inserted through said perforation to force the spring into the plane of the plate 10 and thus permit of relative sliding movement of the door handle and the door prior to separation of the members bodily this pin hole slot 25 may lie beneath the grip 26 of the handle so that it is not readily visible to the eye of an observer. In such an event the slot may be inclined to one side instead of passing through the base of the handle in a direction normal to the plane of the plate 19.

I declare that what I claim is:

A concealed fastening for a pair of members in face to face engagement in which the flat engaging face of one member has connected thereto a thin plate cut at spaced intervals with the cut portions bent out of the plane of the plate to form a number of integral rigid projections and at least one intermediate resilient projection, whilst the other member on a flat face thereof has fixed thereto a thin plate having a corresponding number of slots, the flat face of one of the members being in a recess equal to the superficial area of the plate interconnected therewith and of a depth equal to the thickness of both plates, and the position of an end edge of an intermediate slot being such that it is engaged by the free end of a resilient projection only after the members have been brought together with the rigid projections of one member opposite the end slots of the other and the members have been relatively displaced in sliding engagement to bring the ends of said rigid projections within undercut recesses behind the edges of said end slots.

FREDERICK ARTHUR CLARKE.